United States Patent [19]

Thomasson

[11] Patent Number: 4,467,250
[45] Date of Patent: Aug. 21, 1984

[54] ELECTRIC MOTOR CONTROLS FOR MECHANICAL ACTUATORS

[75] Inventor: James T. Thomasson, Sunland, Calif.

[73] Assignee: Newport Corporation, Fountain Valley, Calif.

[21] Appl. No.: 448,565

[22] Filed: Dec. 10, 1982

[51] Int. Cl.³ .................................................. H02P 1/22
[52] U.S. Cl. ...................................... 318/436; 318/40; 318/331; 318/430; 318/469; 318/490; 33/164 R; 361/31
[58] Field of Search ............... 318/490, 331, 436, 306, 318/308, 469, 484, 430, 431, 40, 284; 33/166, 164 R; 361/28, 30, 31, 33, 238; 324/98

[56] References Cited

U.S. PATENT DOCUMENTS

| | | | |
|---|---|---|---|
| 2,294,831 | 9/1942 | Carson | 33/164 R |
| 2,624,121 | 1/1953 | Knobel | 33/164 R |
| 3,803,470 | 4/1974 | Vosteen | 318/331 |
| 4,338,552 | 7/1982 | Pilz et al. | 318/284 |

FOREIGN PATENT DOCUMENTS

30416  6/1981  European Pat. Off. ............ 318/434

Primary Examiner—G. Z. Rubinson
Assistant Examiner—Bentsu Ro
Attorney, Agent, or Firm—Benoit Law Corporation

[57] ABSTRACT

Methods and apparatus for controlling an electric motor effect operation of such motor by electric energization thereof, and derive from a motor winding or from the back electromotive force of the motor an electric signal indicative of motor speed. The motor is thereupon mechanically stalled, and such stalling is detected from a comparison of the derived speed signal and the electric energization. Deenergization of the motor is effected in response to the stalling detected from the latter comparison. Limit switching of electric motors and actuators without limit switches may be provided in this manner.

31 Claims, 8 Drawing Figures

ELECTRIC MOTOR CONTROLS FOR MECHANICAL ACTUATORS

BACKGROUND OF THE INVENTION

1. Field of the Invention

The subject invention relates to electric motors and, electric motor controls and control methods and systems.

2. Disclosure Statement

This disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also the following comments contain conclusions and observations which have only been drawn or become apparent after conception of the subject invention or which contrast the subject invention or its merits against the background of developments subsequent in time or priority.

In recent years, mechanical actuators have reached a high state of perfection. By way of example, reference may in this respect be had to U.S. Pat. No. 4,174,575, by Kyohiro Nakata, issued Nov. 20, 1979, for Measuring Instrument, and now assigned to the assignee of the subject patent application or patent. One of the measuring instruments disclosed in that patent is a differential micrometer having an adjustment precision of one-half micrometer or 0.0005 millimeters. While that micrometer is, of course, very useful as a measuring instrument, it also serves as a high-precision actuator in such delicate applications as optical component adjustment in holographic or other laser beam utilization systems. A disadvantage of using differential micrometers as component actuators is, however, that they are manually operated.

Attempts have thus been made to provide electrically energized actuators which could take the place of the manually operated micrometer type. Accordingly, a small electric motor with reduction gearhead has been accommodated in a tubular housing, to be axially movable therein. The output shaft of the gearhead was attached to a threaded spindle for translating rotary motion into translatory motion.

This, in turn, called for some limit sensing or handling system. In the past as well as at present, limit switches were and are frequently employed to control the travel of translatorily moving or other components. Such switches, however, have the disadvantage of requiring substantial space, which is a particular design impediment in micrometer and micro-actuator devices.

Also, limit switches require special wiring and connections to a control apparatus and are vulnerable to wear and tear and prone to failure before the normal life span of the remainder of the equipment.

The latter limitations of limit switches are also felt as a drawback in applications other than those so far specifically mentioned. For instance, limit switches often present a danger when translatory or rotary drives are used in explosive or humid environments, where the danger of setting off explosions through electric sparks or electric shocks through insulation failure is particularly prevalent.

Some of these disadvantages may be avoided by the use of rotary encoders, which are also capable of providing overload and stall sensing functions. By way of example, a lengthening of an encoder pulse period as the motor slows down at a limit, stall or severe overload condition may be sensed for control purposes. In particular, if the pulse period is longer than a fixed time threshold, one term of two-term limit sensing function is activated. The second term is activated if the motor driving voltage is higher than a preset positive threshold or lower than a preset negative threshold. The motor driving voltage is typically created by a velocity servo which forces the voltage upward to overcome increasing loads when traveling forward. When the motor driving voltage is higher than a positive threshold and the encoder period is longer than a certain time, a forward limit is indicated. Conversely, when the motor driving voltage is lower than a negative threshold and the encoder period is longer than a certain time, a reverse limit is indicated.

In a prior-art apparatus embodying the latter functions, the active element governing the encoder period was a retriggerable multivibrator that was reset to a non-limit condition each time an encoder transition was input. The retriggerable multivibrator had a time out window of approximately 2.5 milliseconds. The time-window was determined by fixed resistors and capacitors. In order to avoid indication of a limit a short time after just starting the motor, a capacitor was provided for delaying the second limit-sensing term, with the capacitor causing the circuit to wait until the motor reached commanded speed and an encoder transition had occurred.

The major deficiency of that prior-art limit sensing circuit was the fixed time threshold on the retriggerable multivibrator, which meant that the motor had to slow down to the same velocity no matter how fast it was originally going before the limit was sensed.

Another deficiency was that the prior limit sensing circuit required a rotary encoder; a relatively expensive component requiring extra space at the motor or actuator and leads going to the sensing circuit.

SUMMARY OF THE INVENTION

It is a general object of this invention to overcome the disadvantages and to meet the needs expressed or implicit in the above disclosure statement or in other parts hereof.

It is a germane object of this invention to provide improved motor control methods and apparatus.

It is a related object of this invention to provide improved methods and apparatus for detecting motor overload and stalling conditions.

It is also an object of this invention to provide motorized devices with improved motion limit features.

It is a related object of this invention to replace limit switches by an electric motor control.

It is also an object of this invention to provide motorized micrometers and actuators with improved performance and control functions.

Other objects of this invention will become apparent in the further course of this disclosure.

From one aspect thereof, the subject invention resides in methods or apparatus for controlling an electric motor including a motor winding, and, more specifically, resides in the improvement comprising, in combination, the steps of, or means for, providing a command velocity signal corresponding to desired motor speed effecting operation of the motor by electric energization thereof according to the command velocity signal, deriving from the motor winding an electric error signal indicative of motor speed, keeping the derived electric error signal equal to the command velocity signal in energizing the motor, reducing the command velocity signal to zero volts and subjecting the motor to reverse braking action in response to the zero volts command and velocity signal.

Other aspects of the invention will become apparent in the further course of this disclosure, and no limitation to any invention, aspect, scope, object, feature, combination, step or component is intended by this summary of invention.

BRIEF DESCRIPTION OF THE DRAWINGS

The subject invention and its various aspects and objects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

The motorized linear actuator 10 shown in FIGS. 1 to 4 has a cylindrical electric motor 12 axially movable in a hollow-cylindrical housing 13. The motor 12 has a reduction gearhead 14 attached thereto. The gearhead has an output shaft 15 which rotates upon energization of the motor 12 via motor terminals 16 and 17.

Figures 1, 2, 3, 4:
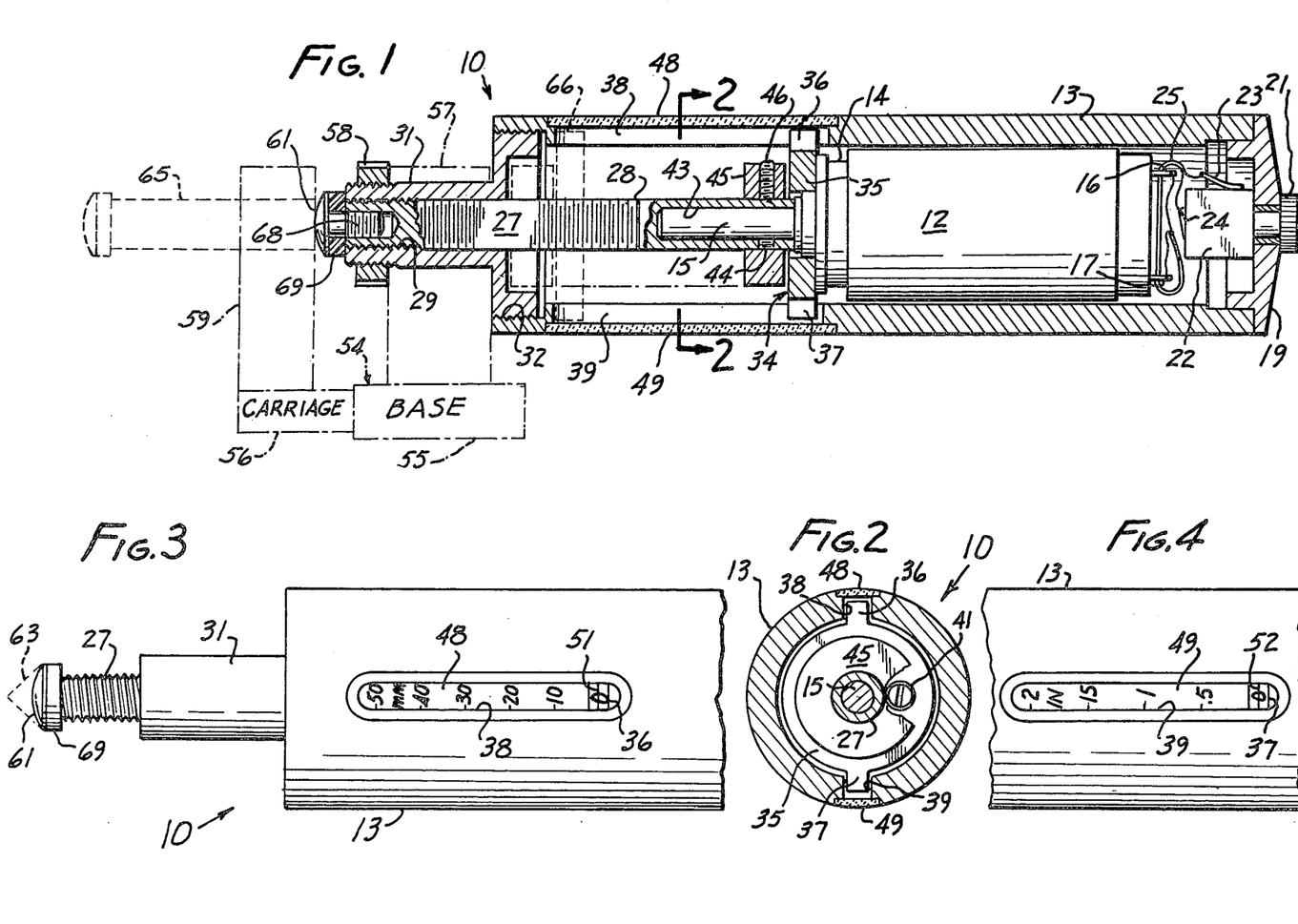
FIG. 1 is a longitudinal section of a motorized actuator employed in a preferred embodiment of the subject invention.
FIG. 2 is a view taken on the line 2—2 in FIG. 1.
FIG. 3 is a partial top view of the apparatus shown in FIG. 1.
FIG. 4 is a bottom view of the apparatus shown in FIG. 1.

The tubular actuator housing 13 has an end cap 19 removably fitted in an end portion thereof. By way of example, the tubular housing 13 may be of a metal, such as aluminum, while the end cap 19 may, for instance, be of a plastic material press fitted into the tubular housing.

In the illustrated embodiment, a phone jack 21 or similar receptacle extends through the end cap 19 into a terminal box having terminals 23 and 24 protruding therefrom. These terminals 23 and 24, which receive electric energizing current for the motor 12 through the jack 21, are connected to the motor terminals 16 and 17 via a couple of wires contained in a cable 25 which is long enough to permit axial travel of the motor 12 in the tubular housing 13.

The actuator 10 translates rotation of the motor 12 or gearhead output shaft 15 into linear travel of a threaded spindle 27.

To this end, the spindle 27 has an external thread 28 meshing with an internal thread 29 of a nose or front piece 31 of the actuator 10. The front piece 31, in turn, is threaded into a front end of the tubular housing 13 at 32.

The actuator 10 further includes a linearly traveling device 34 for translating rotation of the motor 12 into linear travel of the spindle 27. The linearly traveling device 34 includes a keyplate 35 having at least two keys 36 and 37 projecting, respectively, into keyways 38 and 39, provided in the tubular housing 13.

The keyplate 35 is attached to the gearhead 14 by such fasteners as screws, one of which is apparent at 41 in the cutout portion of FIG. 2. In this manner, rotation of motor 12 and gearhead 14 relative to the keyplate 35 and thereby to the tubular housing 13 is inhibited.

On the other hand, the threaded spindle 27 rotates as it thrusts forward out of, and as it retracts into, the front piece 31. However, such rotation is not essential. Rather, the thrusting element of the actuator may move linearly without rotation, as in the above mentioned differential micrometers.

By way of example the leadscrew or spindle 27 has a receiving hole or bore 43 for the gearhead shaft 15 and is attached thereto by a set screw 44, or by an adhesive or other fastener. A retainer or stop element 45 is located ahead of the keyplate 35 and is retained on the spindle 27 by one or more set screws 46. The keyplate 35 is thus disposed between the gearhead 14 and stop element 45, with the stop element 45 being rotatable with the spindle 27.

The linearly traveling device 34 is restrained against rotation at points peripherally distributed relative to such device, by providing at each of the points a pair of interfitting parts including a linear guide 38 or 39 and a member 36 or 37 guided thereby, and by connecting one of such interfitting parts, such as key 36 or 37, to the linearly traveling device 34 and maintaining the other of the interfitting parts, such as the keyway 38 or 39, stationary relative to the one interfitting part 36 or 37.

In the illustrated example, interfitting parts 36 and 38 and 37 and 39 are peripherally distributed at two points relative to the traveling device 34, namely, at two points diametrically opposite each other on the keyplate 35. In prototypes of the illustrated actuator 10, this feature enabled a quadrupling of the thrust of the actuator at the spindle 27 relative to actuators with a single key and keyway. Instead of the two diagrammatically opposed keys and keyway couplets, three such couplets may, for instance, be provided by spacing keys 36, 37, etc., and corresponding keyways 38, 39, etc., 120° apart over the periphery of the keyplate 35. Similarly, four keys and keyway couplets may be provided by spacing four keys and corresponding keyways 90° apart about the keyplate 35.

In this manner, the keys and keyways are capable of absorbing motor-generated side loads, keeping them away from the spindle mechanism. The keyways 38 and 39 are machined or otherwise provided at high precision as antirotation slots in the front half of the tubular housing 13.

Each antirotation slot 38 and 39 is covered by a window 48 or 49 of molded clear styrene, acrylic or another suitable transparent material through which the tab or key 36 or 37 may be observed in its travel along the keyway or slot 38 or 39, and at any rest position. In this respect, each key 36 and 37 is provided with an indicator line 51 and 52, respectively, while each window 48 and 49 is provided with a linear scale. As a special feature of the illustrated example, the scale at the window 48 thus indicates travel of the actuator 10 or spindle 27 in millimeters and fractions thereof, while the scale at the window 49 indicates such travel in inches and fractions thereof.

It is thus seen that the illustrated actuator has at one of the keyways or linear guides 38 a first scale as shown in FIG. 3, indicating linear travel of the actuator 10 in a first system of measurement, such as the metric system, with the aid of a member 36 guided by that one linear guide 38, and further has at another of the keyways or linear guides 39 a second scale, as seen, for instance, in FIG. 4, indicating the linear travel of the actuator 10 in a second system of measurement, such as the inch system, different from the first system, with the aid of a member 37 guided by the other linear guide 39. In practice, this is a great convenience, since it enables the user of the actuator to operate in different systems of measurements without the need for a metric or other conversion.

The electric motor 12 preferably is of a permanent magnetic field or other type that reverses its direction of rotation upon reversal of polarity at the motor terminals 16 and 17. Accordingly, if the motor is energized through the jack 21 with an electric current of a first polarity, it rotates the gear output shaft 15 and thereby the spindle 27 in a first direction so that the motor 12, gearhead 14, keyplate 35, stop element 45 and spindle 27 travel to the left as seen in FIG. 1, while the rotating spindle 27 threads itself through the front piece 31. The spindle 27 is thus thrust out of the front piece 31. Motor 12 may have an armature winding symbolized in FIG. 5 by two concentric circles at 12.

The spindle 27 is thus able to actuate any desired instrument or part. By way of example, FIG. 1 shows in dotted outline and on a reduced scale a carriage structure 54 including a base 55 and a carriage 56 slidable relative thereto. The front piece 31 of the actuator 10 extends through a bracket 57 of the base, and is mounted thereon with the aid of a nut 58 meshing with a threaded end of the front piece 31. The carriage 56 has a rigid arm 59 which is engaged by the spindle 27 or by a special tip 61 thereof. If desired or necessary, the carriage 56 may be biased into or toward the base 55 by a spring or other suitable device (not shown).

By way of example, the carriage 56 may be the carrier of an optical component, such as a lens or mirror in a holographic or other laser beam utilization system (not shown). In that case, the base 55 may be attached to an optical table or other rigid reference surface (not shown). In such and similar scientific or high-technology work, adjustment resolutions in the micron and sub-micron range are now frequently a necessity.

In practice, this need is often coupled with a requirement that the achievable travel of the adjustment be some ten to hundred thousand times larger than the required resolution.

The subject invention enables these requirements to be met in an electrically controlled manner with electrically driven actuators.

The main advantage of the tip 61 is the facility of providing a hardened metallic or other special surface for pushing against a surface of a carriage arm 59 or other part to be actuated. In the illustrated preferred embodiment, the tip 61 has a concave configuration. The convex tip 61 provides practically a single point contact with the part to be actuated. In practice, the shape of the tip 61 can be varied to accommodate various contact configurations. By way of example, the tip 61 may be provided with a conical configuration, as indicated in FIG. 3 in dotted outline 63, in order to fit a "V-groove" in a part to be actuated.

As the motor 12 keeps rotating in one direction, the actuator 10 eventually reaches its outer extreme extension, as indicated in dotted outline at 65 in FIG. 1. At that point, the keyplate 35 and the stop element 45 also reach their extreme outward limit of travel, indicated in dotted outline at 66 in FIG. 1. The element 45 may thereby be designed as a stop engaging the inside of the front piece 31, thereby preventing further linear outward travel of the spindle 27. The stop element 45 may be made of metal or, if desired, of plastic in order to cushion the stopping function. The keyplate 35 may also be a molded plastic part.

The tip 61 may be in the form of a screw threaded into an internally threaded axial front bore 68 of the threaded spindle 27. The head of the tip 61 may have a larger diameter or dimension than the diameter of the spindle 27, so as to provide for a stop limiting retraction of the spindle 27 into the front piece 31 of the actuator. A washer 69 of Teflon or another sturdy cushioning material may be provided between the spindle 27 and the head of the tip 61, in order to cushion and absorb any thrust and shock of the retracting spindle 27 running into its limit of travel.

Figure 5:
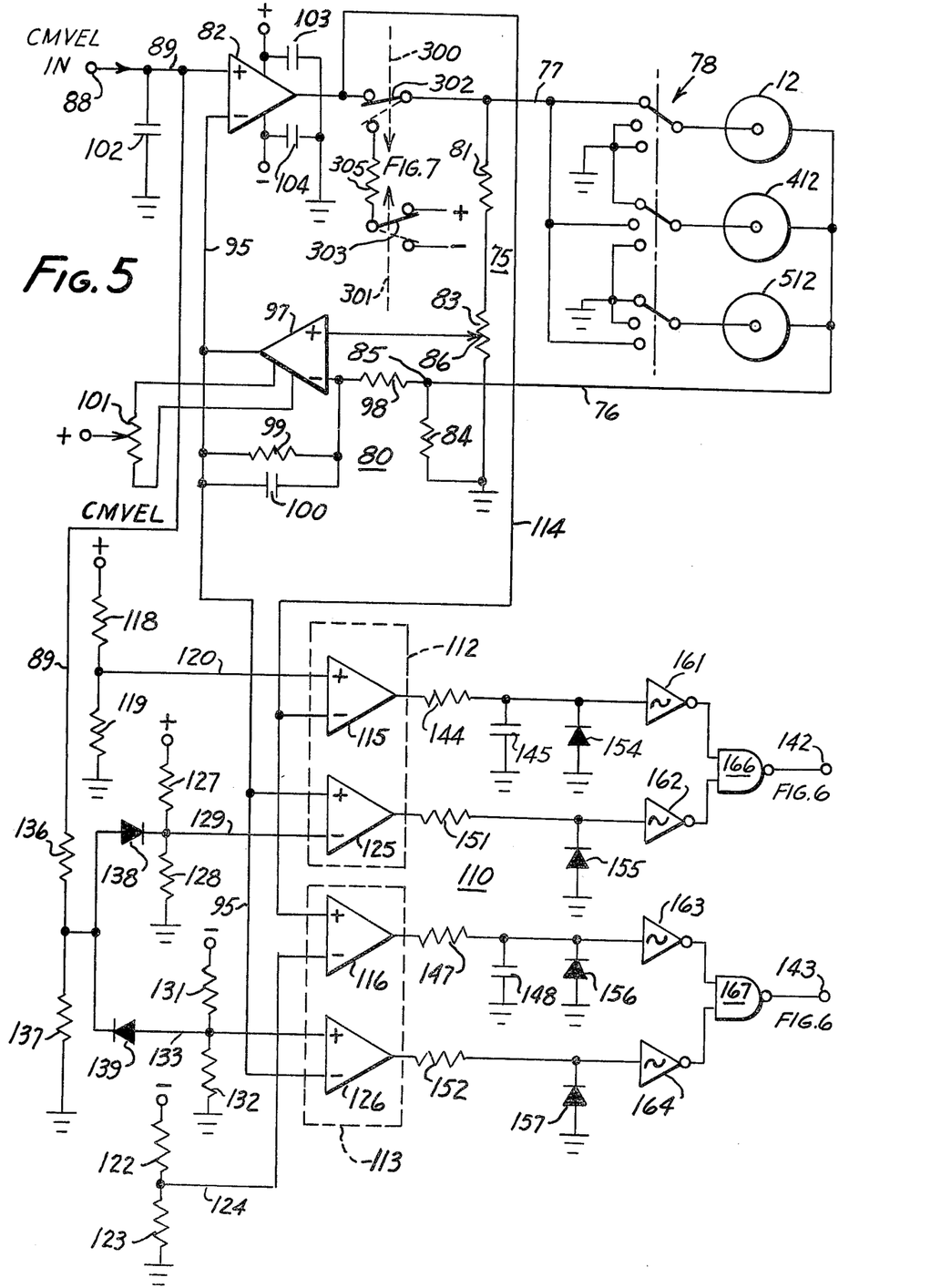
FIGS. 5 and 6, preferably put side by side, constitute a schematic diagram of an electric motor control according to a preferred embodiment of the subject invention.
Figure 6:
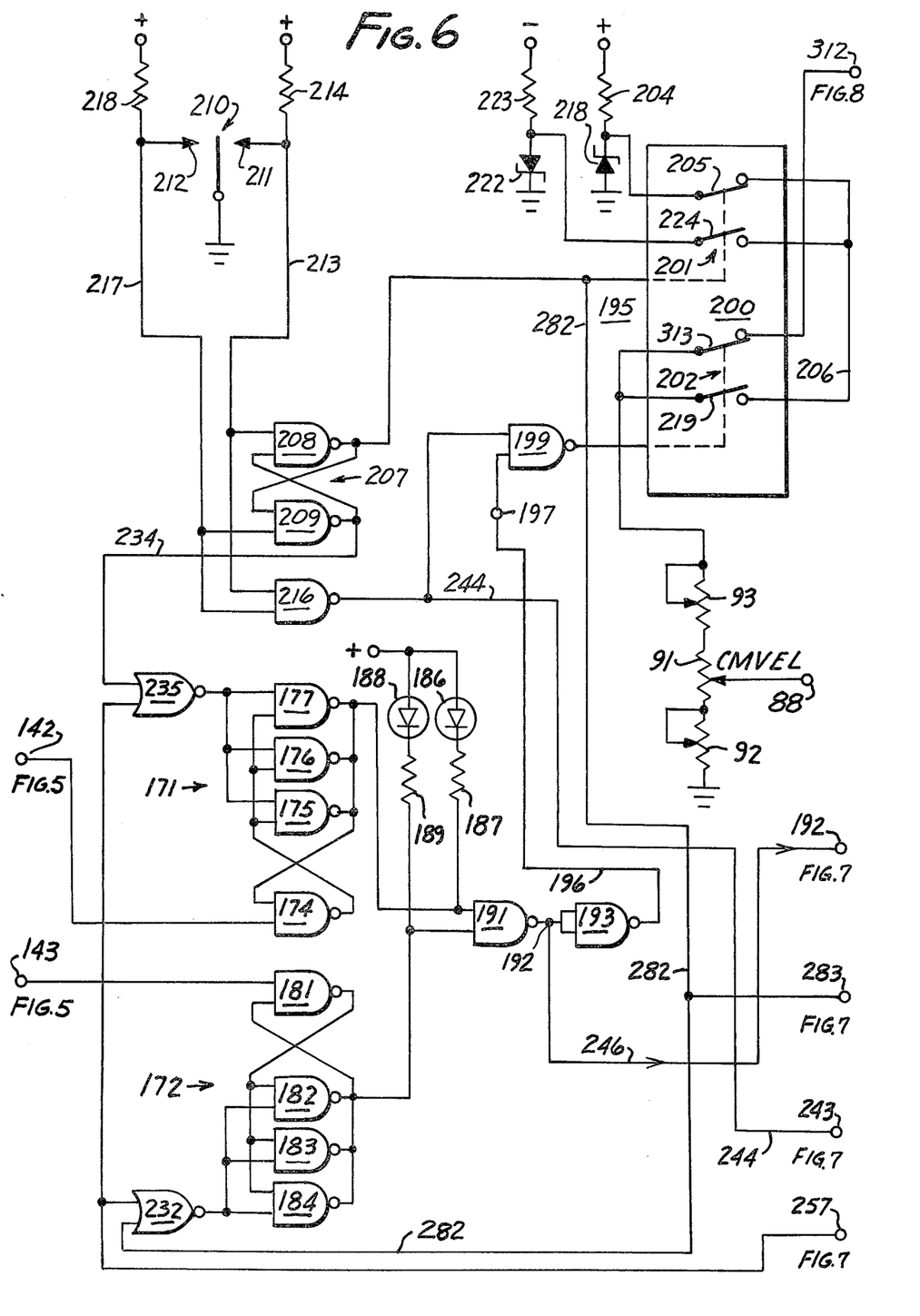
Figure 7:
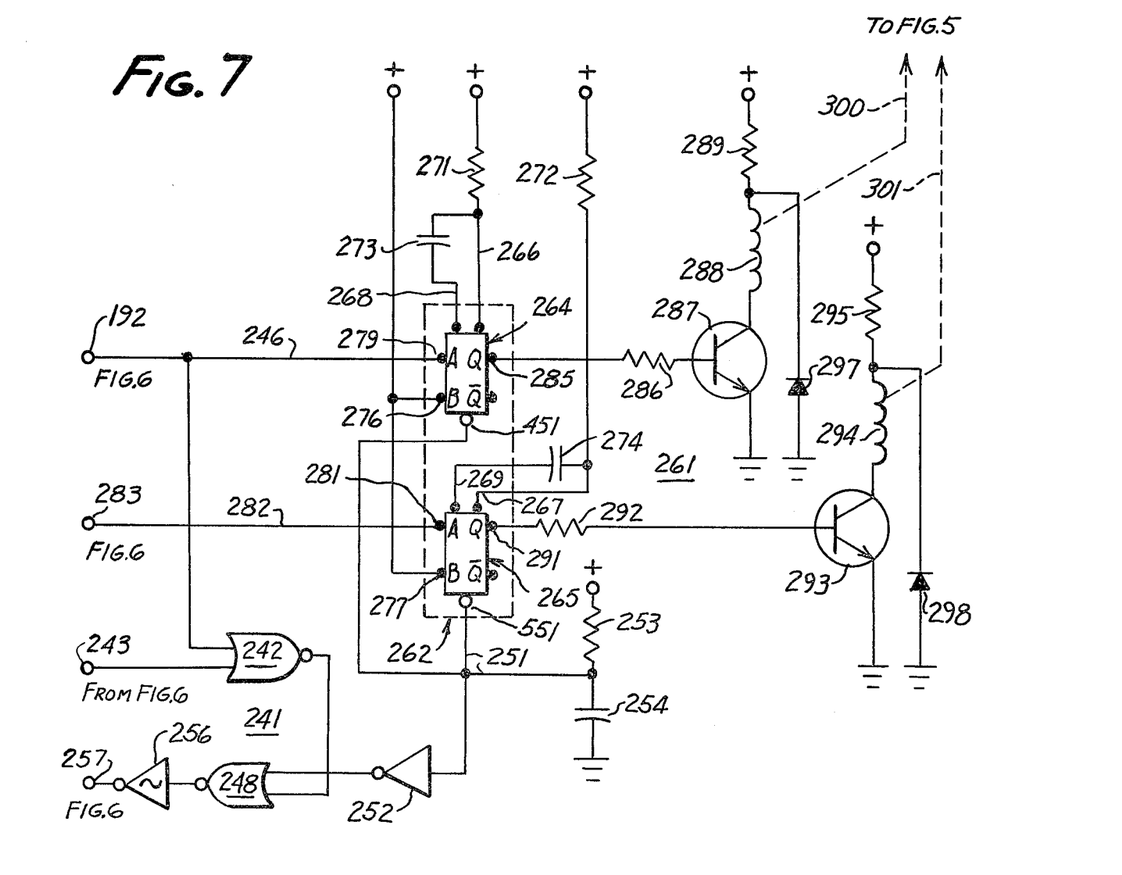
FIG. 7 is a circuit diagram of a supplement to the motor control shown in FIGS. 5 and 6, according to a further embodiment of the subject invention.

Excellent performance of the linear actuator 10 has been achieved with the electric energization and control system shown in FIGS. 5 to 7 hereof. However, while such a combination provides best results, the subject invention is not limited to the use of any particular electric motor or actuator. Rather, the electric energization and control systems of the subject invention and embodiments thereof may be employed for or adapted to all kinds of electric motors.

In practice, the system shown in FIGS. 5 to 7 may be employed for energization of several electric motors. For instance, FIG. 5 shows motors 12, 412 and 512 selectively connectable to the electric energization and control system, hereinafter briefly referred to as "motor control 75." By way of example, the motor 12 may be the motor shown in FIG. 1 for the linear actuator 10. The motors 412 and 512, in turn, may be electric motors of two further actuators (not shown).

The motors 12, 412 and 512 are selectively connectable to motor control output leads 76 and 77 by a multi-position switch 78. In the solidly illustrated first position, the switch 78 connects the motor 12 to the motor control 75 and grounds the motors 412 and 512 to prevent operation thereof and to impede turning of their motor shafts by external means. In a second position, the switch 78 connects the motor 412 to the motor control 75 and grounds the motors 12 and 512. In its third position the switch 78 connects the motor 512 to the control 75 and grounds the motors 12 and 412. In practice, multi-pole, multi-throw switches may be employed at 78.

The motor control 75 employs a balanced bridge servo circuit 80 with error signal feedback. For instance, the coil of the motor 12 may form a bridge with resistors 81, 83 and 84. When the motor 12 is not rotating, its coil acts as a simple passive resistor and the bridge is balanced in the sense that the difference in voltage between the sensor points 85 and 86 of both bridge legs is zero.

The circuit 80 includes a differential amplifier 82 operating as an open-loop drive amplifier. A command velocity voltage (CMVEL) is applied via a terminal 88 and line 89 to the non-inverting input of the differential amplifier 82. The terminal 88 is also shown in FIG. 6, indicating that the command velocity voltage may be derived from the wiper of a velocity control potentiometer 91 being connected in series with trimmer potentiometers 92 and 93, and receiving an electric potential as more fully described below.

The non-inverting input of the differential amplifier 82 receives an amplified error signal via a line 95. When the motor 12, 412 or 512 is at rest, this error signal is essentially zero volts.

When the command velocity voltage derived from the wiper of the potentiometer 91 shown in FIG. 6 is non-zero, such as, for example, one volt, the output of the differential amplifier 82 goes to its maximum positive output value. The motor is accordingly energized and responds to this voltage by reaching commanded speed. In a practical situation this may, for instance, be accomplished within about 50 milliseconds. As the motor rotates, it generates a backward voltage known as the back electromotive force (BEMF). In effect, this BEMF makes the motor coil appear as a larger resistor and unbalances the bridge 81. The center voltage of the two legs of the bridge is amplified by a differential amplifier 97 which has an inverting input connected via a resistor 98 to the line 76 or point 85, and a non-inverting input connected to the wiper 86 of the bridge adjustment resistor 83. The amplified error signal thus produced at the output of the amplifier 97 is applied via line 95 to the inverting input of the differential amplifier 82.

The amplifier 82 will thus continue to output a non-zero voltage, until its two inputs are equal when the error voltage received via line 95 equals the command velocity voltage received via line 89.

The servo circuit including the bridge 81 thus responds to every change in motor velocity by causing the output voltage of the differential amplifier 82 to increase or decrease so as to keep the feedback error signal equal to the command velocity signal.

This circuit is fast acting and has dynamic braking properties. In particular, when the command velocity voltage or signal is brought to zero volts, the drive voltage of the amplifier 82 actually reverses polarity to apply a reverse braking action without actually reversing the sense of rotation of the motor 12, 412 or 512. When the motor is forced to rotate by some external source, the BEMF-generated error signal is compared to a zero-level command velocity signal. This difference produces a drive voltage from the amplifier 82, opposing the externally-generated motor rotation.

The switch 78 routes the motor drive voltage to one of the motors 12, 412 and 512. At the same time, the switch 78 grounds the remaining motors 412 and 512, 12 and 512, or 12 and 412, thereby providing each non-connected motor with a passive braking action, even though the non-used motors are not then connected to the motor control servo system.

In practice, these passive braking properties safeguard the system against manipulation and external influence.

In the circuit according to the illustrated embodiment, resistors 98 and 99 set the gain of the differential amplifier 97 and thus control the maximum motor velocity. A capacitor 100 quiets down the circuit loop and stops parasitic oscillations.

The differential amplifier 97 has a conventional offset adjustment including a potentiometer 101 with which the zero setting of the servo circuit may be adjusted.

A capacitor 102 connected between line 89 and ground quiets the command velocity signal from unwanted pickup. Capacitors 103 and 104 in effect bypass the power supply at the differential amplifier 82, in order to keep that amplifier out of oscillation due to noise in the power supply.

The illustrated preferred embodiment of the subject invention also includes travel limit and stall sensing circuitry 110 which avoids the above mentioned drawbacks of limit switches, code discs and the like.

In particular, the sensing circuit 110 includes two comparators 112 and 113. A line 114 applies the output of the differential amplifier 82 to an inverting input of an operational amplifier 115 in the comparator 112 and to a non-inverting input of an operational amplifier 116 in the comparator 113. The junction between a pair of resistors 118 and 119 is connected by a line 120 to the non-inverting input of the operational amplifier 115. The resistors 118 and 119 are connected in series between a source of positive potential and ground, whereby a predetermined positive potential is applied by line 120 to the non-inverting input of the operational amplifier 115. This operational amplifier 115 in the comparator 112 thus compares the motor drive voltage supplied via lines 77 and 114 to a predetermined positive threshold supplied via line 120.

Similarly, a junction between a pair of resistors 122 and 123 is connected by a line 124 to the inverting input of the operational amplifier 116 in the comparator 113. The resistors 122 and 123 are connected in series between a source of negative potential and ground, whereby the line 124 applies a predetermined negative potential to the inverting input of the operational amplifier 116.

This operational amplifier 116 thus compares the motor drive voltage supply via lines 77 and 114 to a negative threshold voltage supplied via line 124.

The comparators 112 and 113 provide forward and reverse travel limit sensing, respectively. By way of example and in terms of the actuator shown in FIGS. 1 to 4, the forward travel limit may be or correspond to the outer extreme extension 65 at which the keyplate 35 and stop element 45 reach their extreme outward limit of travel, as indicated in dotted outline at 66 in FIG. 1. Similarly, the reverse travel limit may, for instance, be or correspond to the extreme retracted position of the spindle 27 solidly illustrated in FIG. 4, wherein the spindle tip 61 comes to a stop at the front piece 31 via cushioning washer 69.

The comparators 112 and 113, in addition to the operational amplifiers 115 and 116, also include operational amplifiers 125 and 126, respectively. Line 95 applies the output of the amplifier 97 to the non-inverting input of the operational amplifier 125 and to the inverting input of the operational amplifier 126. In this manner, the amplified error feedback signal is applied to the comparators 112 and 113, in addition to the inverting input of the differential amplifier 82.

A junction between a pair of resistors 127 and 128 is applied by a line 129 to the inverting input of the operational amplifier 125. Similarly, a junction between a pair of resistors 131 and 132 is connected by a line 133 to the non-inverting input of the operational amplifier 126.

The resistors 127 and 128 are connected in series between a source of positive potential and ground, whereby the inverting input of the amplifier 125 receives a positive potential via line 129. Conversely, the resistors 131 and 132 are connected in series between a source of negative potential and ground, whereby the non-inverting input of the amplifier 126 receives a negative potential via line 133.

The positive and negative potentials applied via lines 129 and 133 are adjusted in response to the command velocity voltage. To this end, a pair of resistors 136 and 137 is connected in series between the line 89 and ground in order to subdivide the command velocity voltage. The junction between resistors 136 and 137 is connected by a forwardly poled diode 138 to the line 129, while the junction between resistors 136 and 137 is connected by a reversely pole diode 139 to the line 133. The diodes 138 and 139 act as isolation against opposite voltage polarities.

The command velocity voltage received with terminal 88 thus varies the threshold potentials applied to the operational amplifiers 125 and 126. This provides a commanded motor velocity voltage adjustment in the operation of the comparators 112 and 113. In particular, the threshold potentials are varied proportionally to the commanded velocity voltage. For the indication of a forward stall condition at a terminal 142, the motor drive voltage received via line 114, must be greater than the positive threshold voltage applied via line 120, and the feedback error voltage applied via line 95 must be less than the bias provided via resistor 127 and line 129 plus a portion of the command velocity voltage applied via diode 138 and line 129.

Conversely, for a reverse limit stall condition to be indicated at a terminal 143, the motor drive voltage received via line 114 must be less than the negative threshold voltage supplied via line 124, and the feedback error signal received via line 95 must be greater than the negative bias supplied via resistor 131 and line 133 minus the portion of the command velocity voltage derived via line 133 and diode 139.

In order to prevent false limit/stall indications when the motor 12 is initially turned on, the outputs of the operational amplifiers 115 and 116 are time delayed by RC circuits including a resistor 144 and capacitor 145 and a resistor 147 and capacitor 148, respectively. The outputs of operational amplifiers 125 and 126 are current limited by resistors 151 and 152, respectively.

The outputs of operational amplifiers 115, 116, 125 and 126 are truncated to all positive voltages by diodes 154, 155, 156 and 157. Schmidt trigger inverters 161, 162, 163 and 164 clean up slowly moving analog voltages in the outputs of operational amplifiers 115, 116, 125 and 126, converting them to pure digital signals.

Conventional components may be employed for the comparators 112 and 113 and the pulse shaping circuitry connected thereto. For instance, the operational amplifiers 115, 116, 125 and 126 may be of the type LM1458 described, for example on pages 3-188 and 3-189 of the National Semiconductor Corporation LINEAR DATABOOK published 1978.

The shaped and inverted outputs of comparators 115 and 125 are NANDed by a NAND element 166 having its output connected to the terminal 142. Similarly, the inverted outputs of operational amplifiers 116 and 126 are NANDed by a NAND element 167 having its output connected to terminal 143. The terminals 142 and 143 are shown both in FIGS. 5 and 6, thereby indicating how the NAND elements 166 and 167 are connected to the set inputs of the forward limit latch 171 and the reverse limit latch 172, respectively.

The forward limit latch 171 comprises four NAND elements 174, 175, 176 and 177, connected as shown in FIG. 6. The reverse limit latch 172 comprises four NAND elements 181, 182, 183 and 184, also connected as shown in FIG. 6. The NAND elements 174 to 177 constitute a flip-flop element driving a light-emitting diode 186 via a resistor 187. Similarly, the NAND elements 181 to 184 form a flip-flop element for driving a light-emitting diode 188 via a resistor 189. The reset side of each flip-flop latch has a number of NAND elements 175 to 177 or 182 to 184 connected in parallel, in order to provide enough current sink for driving the light-emitting diodes 186 and 188, respectively.

Upon the reaching of a forward limit, such as the fully extended position shown in dotted outline at 65 in FIG. 1, the LED 186 supplies a visual forward limit indication. Conversely, upon attainment of the reverse limit, such as the fully retracted position shown in solid outline in FIG. 1, the LED 188 provides a reverse limit indication.

Broadly speaking, the circuitry 110 determines on the basis of the applied motor drive voltage and command velocity voltage that the motor is drawing a near maximum of energy for moving in either direction, and concludes on the basis of the generated error feedback signal that the motor, nevertheless, either is not moving or is moving less than the threshold derived from the command velocity voltage indicates at 129 or 133. On the basis of this conclusion, the circuitry 110 issues a limit stall signal, such as the forward limit signal indicated by the LED 186 or the reverse limit signal indicated by the LED 188.

The forward and reverse limit outputs of latches 171 and 172 are NANDed by a NAND element 191, the output of which is applied to a terminal 192 and to the input of a further NAND element 193 connected as an inverter.

The latches 171 and 172 thus generate a limit signal for use in a logic module 195.

The logic module 195 has a dual relay 200 including a first double-pole, double-throw switch 201 and a second double-pole, double-throw switch 202.

In the solidly illustrated position, the switch 201 applies a positive potential via a resistor 204 and contact 205 to a line 206. The relay switch 201 is actuated by a flip-flop element 207 composed of NAND elements 208 and 209. The relay switch 202 on the other hand is actuated by the NAND element 199. In this respect, no coils or similar actuating components are shown for the dual relay 200, inasmuch as a solid-state relay device may be employed therefor.

The direction of the motor rotation is determined initially by actuation of a switch 210, spring-biased to the solidly illustrated center position between contacts 211 and 212.

When the switch 210 is in its center position, a lead 213 applies a positive potential via a resistor 214 to a set input of the NAND element 208 of the flip-flop device 207 and to a first input of a NAND element 216, while a line 217 applies a positive potential via a resistor 218 to the reset input of the NAND element 209 of the flip-flop device 207 and to a second input of the NAND element 216.

For rotation of the motor 12 in a forward direction, the switch 210 is actuated so as to ground the contact 211. This causes the flip-flop device 207 to actuate the relay switch 201 to its solidly illustrated position, whereby a positive potential, stabilized by a zener diode 218, is applied to the lead 206 via resistor 204 and relay contact 205. In the absence of a limit stall indication, the relay switch 202 is actuated by the NAND element 199 so that the positive potential is further applied from the lead 206 via a then closed contact 219 to the speed control potentiometer 91 via trimmer resistor 93. A positive command velocity voltage is thus provided at the terminal 88 and may be set at a certain value by the potentiometer 91. As described above, this command velocity voltage is applied via terminal 88 and line 89 to the differential amplifier 82 shown in FIG. 5, causing rotation of the motor 12 in a given forward direction.

For a reverse operation of the motor, the switch 210 is actuated so as to ground its contact 212. This, in turn, will cause the flip-flop device 207 to apply a negative potential, stabilized by a zener diode 222 via a resistor 223 and a then closed relay contact 224 to the line 206. Again, if no limit stop indication is present, this negative potential is further applied to the velocity potentiometer 91 via the contact 219 which is then being kept closed by the NAND element 199. That negative potential, as set by the potentiometer 91, appears as negative command velocity voltage at the terminal 88 and is applied via line 89 to the differential amplifier 82 shown in FIG. 5, so as to cause reverse rotation of the motor 12.

A circuit of the type of balanced bridge servo circuit 81 with differential amplifiers 82 and 97 was employed in the above mentioned prior-art rotary encoder motor control and is herein employed to effect operation of the motor 12 by electric energization thereof. However, the subject invention avoids the need for any rotary encoder, limit switch or similar device, by deriving from a motor winding an electric signal indicative of motor speed. A special or existing winding in the motor 12, etc., may be provided for the generation of the desired speed-indicative signal. According to a preferred embodiment, the speed-indicative signal is derived from the above mentioned back electromotive force (BEMF), providing an electric signal indicative of motor speed which, in the preferred embodiment, manifests itself in the error feedback signal appearing in line 95.

The motor 12 is mechanically stalled when it reaches either limit of its travel. By way of example and as mentioned above, the stop element 45 shown in FIG. 1 may be employed to stall the motor in the extreme extended position 65 of the spindle. Also by way of example the spindle tip 61 with cushion washer 69 may be employed to stall the electric motor in the fully retracted position of the spindle 27. Other means for stalling an electric motor or a device driven thereby at extreme positions may be employed, as desired.

Also, while a rotary motor has been shown and described in the embodiment shown in FIGS. 1 to 4, one or more linear motors may be employed instead. Mechanical stops may then be employed for stalling each linear motor at the opposite ends of its travel.

In practice, the broad scope of the subject invention also includes special situations in which the motor is only stalled at one end of its travel or in which the motor is stalled at any point during its travel.

In either case, the stalling is detected from a comparison of the electric signal indicative of motor speed on the one hand and the energization of the motor on the other hand. By way of recapitulation, the illustrated preferred embodiment employs comparators 112 and 113 for this purpose, in the circuitry 110 as described above.

Deenergization of the motor is then effected in response to the stalling detected from the disclosed comparison, such as the comparison effected at 112 and 113 in the embodiment shown in FIG. 5. In particular, either of the limit latches 171 and 172 provides a stall indication signal via NAND element 191 which, in the embodiment shown in FIG. 6, causes the NAND element 199 via inverter 193, line 196 and terminal 197, to actuate the relay switch 202, thereby opening the contact 219. This, in turn, interrupts application of a positive or negative potential via relay contact 205 or 224 and line 206 to the speed velocity potentiometer 91. The command velocity voltage at terminal 88 thus goes to zero and the motor 12 is consequently deenergized. Due to the above mentioned dynamic braking properties of the illustrated circuit, the motor thus comes to rest very quickly.

In this manner, any damage to the motor from the deliberate mechanical limit stalls, or from any other deliberate or accidental stalling condition, is effectively avoided. Detrimental motor overloads are also avoided when the motor is operating significantly outside of a tolerance or "window" considered acceptable for the velocity servo operation. By way of background, the above mentioned prior-art rotary encoder control already used comparators of the kind shown at 115 and 116 connected to the output of a differential amplifier 82 and resistor pairs 118, 119 and 122, 123, as shown in FIG. 5. However, the illustrated preferred embodiment of the invention provides in the comparators 112 and 113 also the operational amplifiers 125 and 126 and adjusts their bias via lines 129 and 133 in response to the command velocity voltage as disclosed above, whereby a limit/stall indication may be provided whenever the motor operates outside the design velocity servo "window" by more than a predetermined percentage and whereby the feedback threshold follows the actual motor speed. In this manner, the impact of either stop member 45 or 61 is fairly uniform irrespective of actual motor speed when a stall condition is brought about.

In terms of the illustrated preferred embodiment and equivalents thereof, the methods and apparatus for controlling an electric motor 12 provide a mechanical stop having a moving first part 45 or 61 and a second part 31 stationary relative to the first part, and effect operation of the motor 12 by electric energization thereof, such as by means of the motor control or bridge circuit 80. These methods and apparatus also derive from a motor winding 12 an electric signal indicative of motor speed, employing, for instance, the back electro-motive force for providing the error or feedback signal occurring in line 95, and move the first part 45 or 61 with the motor 12 to the second part 31 until the moving first part comes to a stop at the second part, such as at the fully extended position shown in dotted outline at 65 or the solidly illustrated fully retracted position of the spindle 27 shown in FIG. 1.

The motor 12 is mechanically stalled with the first part 45 or 61 coming to a stop at the relatively stationary second part 31, and such stalling is detected from a comparison of the mentioned electric signal with the energization of the motor, such as in the manner disclosed in FIG. 5 with the aid of comparators 112 and 113 of the circuitry 110. Deenergization of the motor 12 in response of the stalling detected from the latter comparison may then proceed in the manner disclosed with respect to FIG. 6.

In terms of the preferred embodiment illustrated in FIGS. 1 to 4 and equivalents thereof, the methods and apparatus of the subject invention provide a pair of spaced mechanical stops 31/45 and 31/61, respectively. These methods and apparatus effect operation of the motor 12 by electric energization thereof, and translate such motor operation into travel between the stops, such as by means of the threaded spindle 27 and front piece 31. The motor 12 is mechanically stalled at either of the stops 31/45 and 31/61, and such stalling is detected from a comparison of the mentioned electric signal indicative of motor speed and the energization of the motor. The energization of the motor is again effected in response to such detected stalling.

As indicated above, the illustrated preferred embodiment distinguishes in its detection between motor stalling and motor start-up, and effects deenergization of the motor 12 only in response to detected motor stalling, as distinguished from motor start-up. For instance, the invention may provide a comparison signal, such as with the aid of comparators 112 and 113, in response to comparison of the BEMF or error feedback signal and the motor energization during start-up of the motor and in response to comparison of the mentioned electric signal and motor energization during stalling of the motor.

As disclosed above, the illustrated preferred embodiment of the subject invention provides such comparison signal to effect deenergization of the motor only upon stalling of the motor, as distinguished from motor start-up. For instance, where the motor 12 goes through its start-up within a predetermined time, the comparison signal produced by comparators 112 and 113 may be subjected to a delay corresponding to such predetermined start-up time. As disclosed in FIG. 5, RC time delay elements 144, 145, 147 and 148 may be employed for this purpose at the output of comparator amplifiers 115 and 116. In this manner, the comparison signal is employed to effect deenergization of the motor only upon such comparison signal persisting beyond the predetermined delay.

As disclosed above with the aid of FIGS. 5 and 6, the electric energization of the motor includes providing a command velocity signal CMVEL corresponding to desired motor speed, such as with the aid of the velocity setting potentiometer 91, and providing a motor drive current with a voltage corresponding to a comparison of the command velocity signal with an electric signal indicative of motor speed, such as with the aid of the differential amplifier 82, and energizing the motor 12, such as via lines 76 and 77, with the motor drive current having the latter corresponding voltage.

In this respect, the comparison of the electric signal indicative of motor speed and the electric energization of the motor may include the steps of comparing the electric signal indicative of motor speed to a first threshold signal, such as with the aid of the operational amplifier 125, and comparing the voltage of the motor drive current to a second threshold signal, such as with the aid of the operational amplifier 115, and indicating the stalling for a detection thereof when the electric signal indicative of motor speed is lower than the first threshold signal while the voltage of the motor drive current is higher than the second threshold signal, as disclosed above with respect to the comparator 112, for instance.

As also disclosed above with respect to FIG. 5, the first threshold signal is preferably adjusted with the command velocity signal, such as via line 89, resistor 136 and diode 138.

For bidirectional operation of the motor 12, the electric signal indicative of motor speed may be compared to a positive first threshold signal, such as with the aid of operational amplifier 125 and resistors 127 and 128, while the voltage of the motor drive current is compared to a positive second threshold signal during operation of the motor in the first sense, such as by means of the operational amplifier 115 and resistors 118 and 119. A signal may then be generated at terminal 142 for indicating the stalling for the detection thereof during operation of the motor 12 in the first sense when the electric signal indicative of motor speed provided in line 95 is lower than the positive first threshold signal provided in line 129 while the voltage of the motor drive current provided in lines 77 and 114 is higher than the positive second threshold signal provided in line 120.

Still for bidirectional operation, the electric signal indicative of motor speed provided in line 95 is compared, such as by an operational amplifier 126, to a negative third threshold signal, such as the negative bias provided in line 133, during operation of the motor 12 in a second sense opposed to the mentioned first sense, and the voltage of the motor drive current, such as occurring in lines 77 and 114, is compared, such as by means of an operational amplifier 116, to a negative fourth threshold signal, such as the bias occurring in line 124, during operation of the motor 12 in that second sense. An indication of stalling for a detection thereof during operation of the motor 12 in its second sense may then be provided at a terminal 143 when the electric signal indicative of motor speed is higher than the negative third threshold signal, while the voltage of the motor drive current is lower than the negative fourth threshold signal disclosed above.

For better operation, the first and third threshold signals provided in lines 129 and 133 may be adjusted with the command velocity signal, such as via line 89, resistor 136 and diodes 138 and 139.

Advantageously, the motor control shown in FIGS. 5 et seq. is combined with the features of the linear actuator disclosed above with respect to FIGS. 1 to 4.

In either case, when the electric motor or parts driven thereby reach a limit or stall, the signal provided by the latching circuitry 171 and 172 via elements 191 and 193 in the line 196 causes the NAND element 199 to actuate the relay switch 202 and to thereby stop the motor by opening the contact 219.

A line 282 extends from the output of the NAND element 208 in the flip-flop device 207 in order to reset the reverse limit latch 172 via a NOR element 232 upon actuation of the switch 210 for forward rotation of the motor 12. Similarly, a line 234 extends from the output of the NAND element 209 of the flip-flop device 207 for resetting the forward limit latch 171 via a NOR element 235 upon actuation of the switch 210 for a reverse operation of the motor 12.

Upon actuation of the switch 210 in either direction, NAND element 216, having inputs connected to the switch contacts 211 and 212 as shown in FIG. 6, provides a signal to an input of the NAND element 199 so as to actuate the relay contact 219 in its closed position for an application of a positive or negative potential via relay contact 205 or 224 and line 206 to the velocity potentiometer 91.

The preferred illustrated embodiment of the subject invention has a circuit 241 for locking out false limit indications. As shown in FIG. 7, this lockout circuit 241 has a NOR element 242 having a first input connected via terminal 243 and a line 244 to the output of the NAND element 216 shown in FIG. 6. That output applies via line 244 and terminal 243 a binary "one" signal to a first input of the NOR element 242 when the circuitry 195 is in a "motor run" condition, and conversely a binary "zero" signal to that first input of the NOR element 242, when the circuitry 195 is in a "motor stop" condition.

Moreover, a line 246 connected to the output of the NAND element 191 at the limit latches 191 and 192 applies a binary "one" via a terminal 192 to the second input of the NOR element 242 when a limit is detected at 171 or 172, and conversely applies a binary "zero" via that terminal 192 while no limit has been detected.

The output of the NOR element 242 is connected to a first input of a further NOR element 248 in the lockout circuit 241.

A second input of the NOR element 248 receives a reset signal via a line 251 and inverting Schmidt trigger 252. A resistor 253 and capacitor 254 are connected in series between a source of positive potential and ground, and the junction between resistor 253 and capacitor 254 is connected via line 251 to the trigger 252, as shown in FIG. 7. The output of the NOR element 248 is connected by an inverter 256 and a terminal 257 shown in FIGS. 6 and 7 to inputs of NOR elements 232 and 235 which, as described above, reset the forward and reverse limit latches 171 and 172. In this manner, the circuit 241 is able to lock out false limit indications which could otherwise occur during a "power up" condition, such as when the motor 12 is in the process of reaching a desired speed upon actuation of the switch 210 in either direction.

Without the lockout circuit 241, it might be possible to activate a reverse limit when clearing a forward limit. The lockout circuit 241 shown in FIG. 7 and NOR gates 232 and 235 shown in FIG. 6 inhibit activation of such false limit if the run/stop signal provided at the output of NAND elements 191 and 216 is still at "stop" during clearance of a limit latch 171 or 172.

The series-connected resistor 253 and capacitor 254 act as an RC time delay network which issues the reset signal along line 251 a predetermined time after power for the motor control has been turned on. Line 251 is also connected to clear inputs 451 and 551 of multivibrators 264 and 265 for resetting a dual multivibrator 262 more fully described below.

In practice, running a motor or motor-driven part into a limit or mechanical stall condition frequently is like tightening a nut on a screw. For instance, if the actuator 10 shown in FIGS. 1 to 4 is run at high speed to its extended position 65, the stop element 45 on the rotating spindle 28 may be mechanically tightened against the front piece 31 during the mechanical stalling of the motor 12 with such force, as to render subsequent movement of the stop element 45 away from the front piece 31 difficult at a slow speed.

Similarly, if the spindle 27 is retracted at high speed, such mechanical tightening between the spindle tip region at 61 and the front piece 31 could occur, as to render subsequent extension of the spindle difficult at a slow speed.

As indicated above, a washer 69 of Teflon or another sturdy cushioning material may be provided between the spindle 27 and the head of the tip 61, in order to cushion and absorb any thrust and shock of the retracting spindle 27 running into its limit at the front piece 31. Similarly, the stop member 45 may be made of a plastic material or may otherwise be cushioned. In practice, such cushioning, however, does not necessarily reduce the problem of mechanical tightening of the movable stop member onto its relatively stationary counterpart. To the contrary, cushioning of one or both of the stops may even aggravate the tightening problem, depending on the type of cushioning material employed.

Reference should now be had to FIG. 7 for the following disclosure of a solution of the mechanical stop or stall tightening problem.

In particular, FIG. 7 shows a circuit 261 for clearing mechanical stop or stall tightening upon reenergization of the motor after a stop or stall. The clearing circuit 261 comprises a dual monostable multivibrator 262 which, by way of example, may be of the type MM74C221 as shown and described, for instance, on pages 1-91 to 1-94 of the National Semiconductor Corporation CMOS INTEGRATED CIRCUITS Handbook published 1977.

Each of the multivibrators 264 and 265 of the multivibrator set 262 has an external RC terminal 266 and 267 and an external C terminal 268 and 269 respectively. Each terminal 266 and 267 is connected by a resistor 271 and 272, respectively, to a positive power source terminal. A capacitor 273 is connected between the terminals 266 and 268, and a capacitor 274 is connected between the terminals 267 and 269. The RC components 271, 273 and 272, 274 provide sufficient time delay for a stall or limit to be cleared before the motor drive voltage drops to the command velocity setting of the potentiometer 91.

Multivibrators 264 and 265 have positive-transition-triggered inputs 276 and 277, respectively, connected to a source of positive potential. The multivibrator 264 has a negative-transition-triggered input 279 connected via terminal 192 and line 246 to the output of the NAND element 191 shown in FIG. 6. The first multivibrator 264 of the set 262 in FIG. 7 thus responds to the output signal of the NAND element 191 returning from a binary "one" level to zero upon clearance of the forward or reverse limit latch 171 or 172 at the end of a forward or reverse limit cycle.

The second multivibrator 265 of the set 262 has a negative-transition-triggered input 281 connected via line 282 and terminal 283 to the output of the direction flip-flop device 207. It may be recalled in this respect that the flip-flop device 207 determines via relay switch pair 201 the polarity of the motor energization circuit and thereby the direction of rotation of the motor 12.

The second multivibrator 265 issues as pulse to a relay driver transistor 293 in response to a signal via line 283 indicating a change from the forward to the reverse direction. The first multivibrator 264, on the other hand, is activated when any limit latch 171 or 172 is reset.

The multivibrator 264 has a Q output 285 connected via a current limiting resistor 286 to the base of a transistor 287. The transistor 287 drives a relay 288 connected via a current limiting resistor 289 to the positive power supply terminal. Similarly, the second multivibrator 265 has a Q output 291 connected via a current limiting resistor 292 to the base of a transistor 293. The transistor 293 drives a relay 294 connected via a current limiting resistor 295 to the positive power supply terminal. Diodes 297 and 298 are connected in parallel to the transistor 287 and relay 288 and to transistor 293 and relay 294, respectively, in order to prevent malfunction and damage due to transients.

Reference should now be had to phantom lines 300 and 301 shown in FIGS. 5 and 7, for an understanding of the operation of relays 288 and 294.

In particular, as indicated by phantom line 300 the relay 288 actuates a double-throw switch 302 and, as indicated by phantom line 301, relay 294 actuates a double-throw switch 303.

Relay switch 302 has a normally closed position indicated in solid outline in FIG. 5. In that position, normally closed relay switch 302 connects the output of the differential amplifier 82 to the motor line 77 for application of the motor drive current to the motor 12 via motor selector switch 78. In this respect, what is herein said with respect to motor 12 also applies to the further motors 412 and 512 whenever either of them is connected to the power supply lead 77 by the selector switch 78.

Upon resetting of either latch 171 and 172 from a forward or reverse limit of the travel of actuator 10 or motor 12, the relay 288 is energized via first multivibrator 264 as described above. Accordingly, the relay 288 actuates its contact 203 from its solidly illustrated normal position to its alternative position shown by a dotted line in FIG. 5, whereby the motor energization lead 77 is connected via a current limiting resistor 305 to the contact 303 of the second relay 294. Like the second multivibrator 265, the second relay 294 is "on" for a predetermined time after a direction change from forward to reverse.

Accordingly, the second relay switch 303 is in its solidly illustrated position shown in FIG. 5 when a reverse limit has been reset.

In other words, if the actuator 10, for example, has been run into its retracted limit solidly illustrated in FIG. 1, and if that retracted limit is to be reset or released for advancement of the spindle 27 to an extended position, then the actuated relay contact 302 and the solidly illustrated relay contact 303 apply an increased positive voltage via line 77 to the motor 12, thereby in effect "kicking" such motor or actuator 10 out of its retracted limit.

Conversely, if the limit to be released was a forward limit, such as the fully extended limit shown by dotted line at 65 in FIG. 1, then the second relay 294 is in its actuated position, whereby the relay contacts 302 and 303 in their alternative positions indicated by dotted lines in FIG. 5 apply an increased negative voltage to the motor energization line 77 and motor 12, thereby kicking the motor 12 or actuator 10 out of its fully extended limit preparatory to a retraction of the motor spindle 27, as soon as actuation of the first multivibrator 264 and relay 288 indicates a resetting of the particular forward limit latch.

It will thus be recognized that where a first part 45 or 61 of a mechanical stop has been tightened by the motor 12 onto the second part 31, the motor 12 is reenergized by the circuit 261 over relay contacts 302 and 303 in a sense tending to move the first part 45 or 61 away from the second part 31 and that, by the same means including relay contacts 302 and 303, such tightened first part 45 or 61 is detached by additional energization of the motor 12 in the particular forward or reverse sense by selective application of a positive or negative voltage to the motor, as determined by the condition of energization and actuation of the second relay 294 and its relay contact 303.

In the course of reenergization of the motor 12 or actuator 10 for travel between the stops 45 and 61, the circuit 261 with relay switches 302 and 303 thus additionally energizes the motor during such reenergization for accelerating the travel of the motor or actuator away from either stop at 31/45 or 31/61. Again, this feature may be combined with the cushioning of the stops, such as at 69 or the stop 31/61.

The circuitry 261 with relay switches 302 and 303 thus provides a "kick" to the motor 12 to clear any stall or limit no matter what the command velocity indicated by the command velocity voltage is at the time. The motor 12 and actuator 10 are thus able to come out of any stall or limit even if the command velocity voltage is set at 91 for a slow motor and actuator speed.

Upon expiration of the time delay imposed by the RC network 271 and 273, the first multivibrator 264 automatically deenergizes the first relay 288, whereby the relay switch 302 automatically returns to its solidly illustrated position shown in FIG. 5. The motor control is thus automatically taken over by the set command velocity voltage, as soon as the motor or actuator has been kicked off a limit or stall condition.

In the illustrated preferred embodiment of the subject invention, the feature disclosed with the aid of circuit 261 advantageously may also be employed to clear stalls other than deliberate travel limits. For instance, if the extending spindle should encounter an obstacle in the course of its travel, the circuit 110 including comparator 112 will automatically indicate a forward limit at terminal 142, which will cause the forward limit flip-flop 171 to latch, thereby causing deenergization of the motor as described above with the aid of NAND elements 191, 193 and 199 and the relay 200.

If the operator then actuates the switch 210 to a motor reverse position, the circuit 261 automatically comes into play through release of the latch 171, and the motor or actuator will effectively be kicked off the particular obstacle through energization of relays 288 and 294. In practice, the step of reenergizing the motor in a sense tending to move a tightened first part 46 or 61 away from the second part 31 of the limit stop and detaching such tightened first part or limit stop by additionally energizing the motor in that sense, may be effected either as shown in FIGS. 6 and 7 or automatically whenever the motor is deenergized in response to a limit stop.

The circuitry 261 and equivalents thereof within the scope of the subject invention perform an important overload protection and stall condition release function without the use of the usual bimetal, thermocouple or other conventional overload sensing and protection means customarily associated with such function. Equally important in practice, the automatic shut-off feature according to the invention protects any delicate instruments actuated by the motor 12 via spindle 27, avoiding distortion and damage thereof.

FIG. 6 shows an input terminal 312 connected to a further contact 313 of the relay switch 202. In practice, electric pulses may be applied to the terminal 312 in order to "jog" the travel of motor 12 or spindle 27 by short distances. By way of example, the pulse generator 315 shown in FIG. 8 may be employed for jogging the motor 12 or spindle 27. The pulse generator 315 includes an operational amplifier 316 having a non-inverting input connected to the junction of three resistors 317, 318 and 319. The resistor 317 is connected between the output of the amplifier 316 and the non-inverting input thereof. The resistors 318 and 319 are connected in series between positive and negative power supply terminals.

Figure 8:
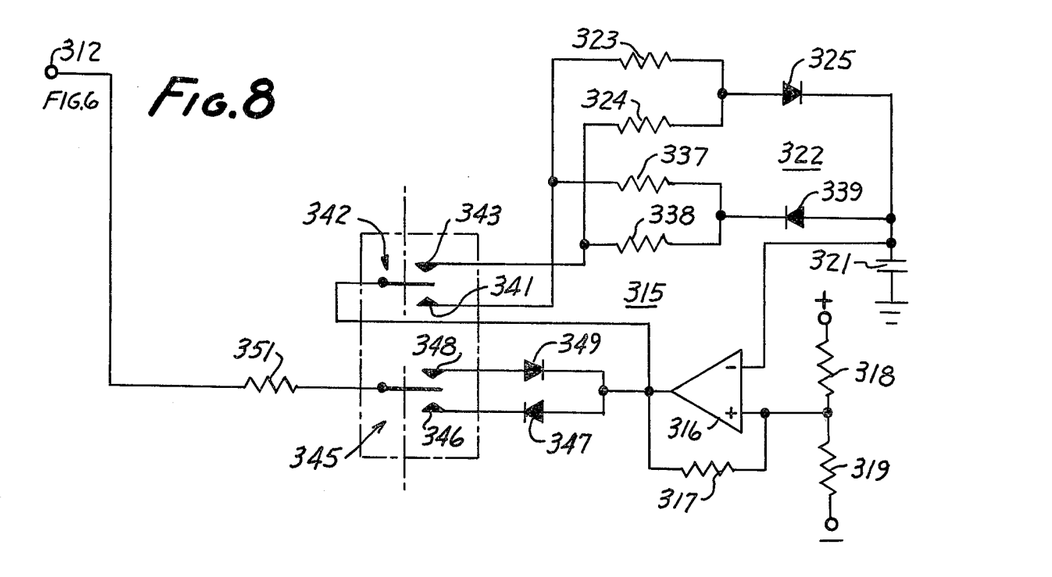
FIG. 8 is a schematic diagram of a further supplement for the motor control shown in FIGS. 5 and 6. The sheet containing FIGS. 7 and 8 may be placed next to the sheet containing FIG. 6 for a continuity of the circuit diagrams shown therein.

The inverting input of the amplifier 316 is connected to the junction of a grounded capacitor 321 and a feedback circuit 322.

The circuit 322 includes resistors 323 and 324 connected in series with a diode 325 in a first branch, and resistors 337 and 338 connected in series with a diode 339 in a second branch. Resistors 323 and 337 are, in turn, connected to a first stationary contact 341 of a first double-throw switch 342, while resistors 324 and 338 are connected to a second stationary contact 343 of the switch 342. A second switch 345 has a first stationary contact 346 connected via a diode 347 to the output of the amplifier 316, and a second stationary contact 348 via a diode 349 to the output of the amplifier 316. Both diodes 347 and 349 are also connected to the switch 342, as shown in FIG. 7.

The switch 345, in turn, is connected through a resistor 351 to the terminal 312 shown in FIGS. 6 and 8.

The contact 313 of relay switch 202 is open when the contact 219 of that switch is closed for the provision of a command velocity voltage via resistor 204 or 223 and velocity potentiometer 91. Accordingly, no pulses will then be supplied via terminal 312. On the other hand, if the NAND element 199 actuates or permits actuation of the relay switch 202 to its solidly illustrated position shown in FIG. 6, the command velocity signal ceases upon opening of the relay contact 219 and jogging pulses may be applied to the velocity potentiometer 91 through terminal 312 and then closed relay contact 313.

For instance, if the ganged switches 342 and 345, as seen in FIG. 8, are depressed downwardly into engagement with the stationary contact 341 and 346 respectively, then a positive-going electric pulse is generated for a forward inching of the actuator 10 or spindle 27. The generated positive-going pulse is applied via terminal 312, then closed relay contact 313, velocity potentiometer 91, terminal 88 and line 98 to the motor control 75 shown in FIG. 5, causing a short energization of the motor 12 in a forward sense, whereby the position of the spindle 27 is slightly advanced in the direction of its expanded position shown at 65 in FIG. 1.

On the other hand, if the ganged switches 342 and 345, as seen in FIG. 8, are lifted upwardly into engagement with the stationary contacts 343 and 348, then a negative-going electric pulse is generated by the oscillator 315 and is applied via terminals 312, then closed relay contact 313, velocity potentiometer 91, terminal 88 and line 89 to the motor control 75 for a reverse jogging of the spindle 27 through reverse energization of the motor 12.

According to the illustrated preferred embodiment, the oscillator 315 generates several pulses per second. For instance, a rate of five generated pulses per second has been found practical. Accordingly, the inching or jogging of motor 12 and spindle 27 may be repetitive during continuous actuation of ganged switches 342 and 345.

Accordingly, it will be recognized that the circuit 315 generates one or more positive-going electric pulses, depending on the length of actuation of switches 342 and 345, and employs such positive-going electric pulse or pulses to jog the motor 12 in a first sense of operation. The circuitry 315, upon reverse actuation of switches 342 and 345, generates one or more negative-going electric pulses. The circuitry 195 shown in FIG. 6 and motor control 75 shown in FIG. 5 employ the negative-going electric pulse or pulses to jog the motor 12 in a second sense of operation opposed to the mentioned first sense.

In this manner, the spindle 27 and any arm 59 or carriage 56 coupled thereto may be incrementally moved forward and incrementally moved selectively backward, as desired.

The intensity of the positive-going or negative-going pulses acting on the motor 12 is determined by the setting of the velocity potentiometer 91 which thus determines the hardness of the kick with which the motor 12 and spindle 27 are incremented forwardly or reversely. In the illustrated preferred embodiment of the invention, the jog function initiated by actuation of ganged switches 342 and 345 and oscillator 315 is not truly servo-controlled but simply kicks the motor 12 and spindle 27 with a small, controllable amount of energy. By way of example, it is easily possible in this manner to cause movement of the motor 12 by about one-hundredth of a revolution for each jog pulse in a low setting of the velocity potentiometer 91. For a high setting of the potentiometer 91, movement of the motor 12 by one-tenth of a revolution in response to each jog pulse is a practical value.

The subject invention and its embodiments meet the initially stated needs and objectives and overcome the initially stated disadvantages.

The subject extensive disclosure will render apparent and suggest to those skilled in the art various modifications and variations within the spirit and scope of the subject invention.

I claim:

1. In a method of controlling an electric motor including a motor winding, the improvement comprising in combination the steps of:
   providing a command velocity signal corresponding to desired motor speed;
   effecting operation of said motor by electric energization thereof according to said command velocity signal;
   deriving from said motor winding an electric error signal indicative of motor speed;
   keeping said derived electric error signal equal to said command velocity signal in energizing said motor;
   reducing said command velocity signal to zero volts; and
   subjecting said motor to reverse braking action in response to said zero volts command velocity signal.

2. A method as claimed in claim 1, wherein:
   said electric error signal is derived from a back electromotive force of said motor; and
   said error signal is compared to said zero volts command velocity signal to produce a drive voltage for said motor opposing externally generated motor rotation.

3. A method as claimed in claim 1, including the steps of:
   mechanically stalling said motor;
   detecting said stalling from a comparison of said derived electric error signal and said electric energization;

effecting deenergization of said motor in response to said stalling detected from said comparison;

distinguishing in said detection between motor stalling and motor startup; and effecting said motor deenergization only in response to detected motor stalling, as distinguished from motor startup.

4. A method as claimed in claim 1, including the steps of:

providing a comparison signal in response to comparison of said derived electric signal and said energization during startup of said motor and in response to comparison of said derived electric signal and said energization during stalling of said motor; and employing said comparison signal to effect deenergization of said motor only upon stalling of said motor, as distinguished from motor startup.

5. A method as claimed in claim 1, including the steps of:

providing for a startup of said motor within a predetermined time;

providing a comparison signal in response to comparison of said derived electric signal and said energization during said startup and in response to comparison of said derived signal and said energization during said stalling;

subjecting said comparison signal to a delay corresponding to said predetermined time; and employing said comparison signal to effect deenergization of said motor only upon said comparison signal persisting beyond said delay.

6. In a method of controlling an electric motor including a motor winding, the improvement comprising in combination the steps of:

effecting operation of said motor by electric energization thereof including providing a command velocity signal corresponding to desired motor speed, providing a motor drive current with a voltage corresponding to a comparison of said command velocity signal with said derived electric signal indicative of motor speed, and energizing said motor with said motor drive current having said corresponding voltage;

deriving from said motor winding an electric signal indicative of motor speed;

mechanically stalling said motor;

detecting said stalling from a comparison of said derived electric signal and said electric energization; and effecting deenergization of said motor in response to said stalling detected from said comparison.

7. A method as claimed in claim 6, wherein said comparison of said derived electric signal indicative of motor speed and said electric energization of the motor includes the steps of:

comparing said derived electric signal indicative of motor speed to a first threshold signal;

comparing said voltage of the motor drive current to a second threshold signal; and indicating said stalling for said detection thereof when said derived electric signal indicative of motor speed is lower than said first threshold signal while said voltage of the motor drive current is higher than said second threshold signal.

8. A method as claimed in claim 7, including the steps of:

adjusting said first threshold signal with said command velocity signal.

9. A method as claimed in claim 6, wherein said comparison of said derived electric signal indicative of motor speed and said electric energization of the motor includes the steps of:

comparing said derived electric signal indicative of motor speed to a positive first threshold signal during operation of said motor in a first sense;

comparing said voltage of the motor drive current to a positive second threshold signal during operation of said motor in said first sense;

indicating said stalling for said detection thereof during operation of said motor in said first sense when said derived electric signal indicative of motor speed is lower than said positive first threshold signal while said voltage of the motor drive current is higher than said positive second threshold signal;

comparing said derived electric signal indicative of motor speed to a negative third threshold signal during operation of said motor in a second sense opposed to said first sense;

comparing said voltage of the motor drive current to a negative fourth threshold signal during operation of said motor in said second sense; and indicating said stalling for said detection thereof during operation of said motor in said second sense when said derived electric signal indicative of motor speed is higher than said negative third threshold signal while said voltage of the motor drive current is lower than said negative fourth threshold signal.

10. A method as claimed in claim 9, including the step of:

adjusting said first and third threshold signals with said command velocity signal.

11. A method as claimed in claim 6, including the steps of:

generating a positive-going electric pulse;

employing said positive-going electric pulse to jog said motor in a first sense of operation;

generating a negative-going electric pulse; and employing said negative-going electric pulse to jog said motor in a second sense of operation opposed to said first sense.

12. A method as claimed in claim 6, including the steps of:

providing a mechanical stop having a moving first part and a second part stationary relative to said first part;

moving said first part with said motor during said operation relative to said second part until said moving first part comes to a stop at said second part;

effecting said mechanical stalling of said motor with said first part coming to a stop at said relatively stationary second part; and effecting deenergization of said motor in response to said stalling effected with said first part coming to a stop at said relatively stationary second part and detected from said comparison.

13. A method as claimed in claim 12, including the step of:

mechanically tightening said first part with said motor onto said second part;

reenergizing said motor in a sense tending to move said first part away from said second part; and detaching said tightened first part by additionally energizing said motor in said sense.

14. In a method of controlling an electric motor including a motor winding, the improvement comprising in combination the steps of:
   effecting operation of said motor by electric energization thereof;
   deriving from said motor winding an electric signal indicative of motor speed;
   providing a pair of spaced mechanical stops;
   translating said operation of the motor into travel between said stops;
   effecting mechanical stalling of said motor at either of said stops;
   detecting said stalling from a comparison of said derived electric signal and said electric energization;
   effecting deenergization of said motor in response to said stalling at either of said stops detected from said comparison;
   reenergizing said motor for travel between said stops; and
   additionally energizing said motor during said reenergization for accelerating said travel away from either of said stops.

15. In apparatus for controlling an electric motor including a motor winding, the improvement comprising in combination:
   means for providing a command velocity signal corresponding to desired motor speed;
   means for effecting operation of said motor by electric energization thereof according to said command velocity signal;
   means connected to said motor winding for deriving from said motor winding an electric error signal indicative of motor speed;
   means connected to said command velocity signal providing means and electric error signal deriving means for keeping said derived electric error signal equal to said command velocity signal in energizing said motor;
   means connected to said motor for subjecting said motor to reverse braking action in response to a zero volts command velocity signal.

16. Apparatus as claimed in claim 15, wherein:
   said electric signal deriving means include means for sensing a back electromotive force of said motor winding and means connected to said sensing means for deriving from said back electromotive force said electric error signal indicative of motor speed; and
   means connected to said electric signal deriving means and to said command velocity signal providing means for producing by comparison of said zero volts command velocity signal and said error signal a drive voltage for said motor opposing externally generated motor rotation.

17. Apparatus as claimed in claim 15, including:
   means connected to said electric error signal deriving means for distinguishing between motor stalling and motor startup, and for effecting motor deenergization only in response to detected motor stalling, as distinguished from motor startup.

18. Apparatus as claimed in claim 15, including:
   means connected to said electric error signal deriving means for effecting a comparison of said derived electric error signal and said energization during startup of said motor and during stalling of said motor, and means for providing a comparison signal to effect deenergization of said motor only upon stalling of said motor, as distinguished from motor startup.

19. Apparatus as claimed in claim 15, wherein:
   said operation effecting means include means for providing for a startup of said motor within a predetermined time; and
   said apparatus includes means connected to said electric error signal deriving means for providing a comparison signal in response to comparison of said derived electric error signal and said energization during said startup and in response to comparison of said derived electric error signal and said energization during stalling, means for subjecting said comparison signal to a delay corresponding to said predetermined time and means for employing said comparison signal to effect deenergization of said motor only upon said comparison signal persisting beyond said delay.

20. In apparatus for controlling an electric motor winding, the improvement comprising in combination:
   means for effecting operation of said motor by electric energization thereof, said operation effecting means including means for providing a command velocity signal corresponding to desired motor speed, means for providing a motor drive current with a voltage corresponding to a comparison of said command velocity signal with said derived electric signal indicative of motor speed, and means for energizing said motor with said motor drive current having said corresponding voltage;
   means connected to said motor winding for deriving from said motor winding an electric signal indicative of motor speed;
   means connected to said operation effecting means for detecting stalling of said motor from a comparison of said derived electric signal and said electric energization; and
   means connected to said detecting means for effecting deenergization of said motor in response to said stalling detected from said comparison.

21. Apparatus as claimed in claim 20, wherein said detecting means include:
   first means for comparing said derived electric signal indicative of motor speed to a first threshold signal;
   second means for comparing said voltage of the motor drive current to a second threshold signal; and
   third means connected to said first and second means for indicating said stalling for said detection thereof when said electric signal indicative of motor speed is lower than said first threshold signal while said voltage of the motor drive current is higher than said second threshold signal.

22. Apparatus as claimed in claim 20, including:
   means connected to said first means for adjusting said first threshold signal with said command velocity signal.

23. Apparatus as claimed in claim 20, wherein said detecting means include:
   first means for comparing said derived electric signal indicative of motor speed to a positive first threshold signal during operation of said motor in a first sense;
   second means for comparing said voltage of the motor drive current to a positive second threshold signal during operation of said motor in said first sense;

third means connected to said first and second means for indicating said stalling for said detection thereof during operation of said motor in said first sense when said derived electric signal indicative of motor speed is lower than said positive first threshold signal while said voltage of the motor drive current is higher than said positive second threshold signal;

fourth means for comparing said derived electric signal indicative of motor speed to a negative third threshold signal during operation of said motor in a second sense opposed to said first sense;

fifth means for comparing said voltage of the motor drive current to a negative fourth threshold signal during operation of said motor in said second sense; and sixth means connected to said fourth and fifth means for indicating said stalling for said detection thereof during operation of said motor in said second sense when said derived electric signal indicative of motor speed is higher than said negative third threshold signal while said voltage of the motor drive current is lower than said negative fourth threshold signal.

24. Apparatus as claimed in claim 23, including:
means connected to said first and fourth means for adjusting said first and third threshold signals with said command velocity signal.

25. Apparatus as claimed in claim 20, including:
means for generating a positive-going electric pulse and for generating a negative-going electric pulse; and means connected to said generating means and operation effecting means for employing said positive-going electric pulse to jog said motor in a first sense of operation and said negative-going electric pulse to jog said motor in a second sense of operation opposed to said first sense.

26. Apparatus as claimed in claim 20, including:
a mechanical stop having a moving first part and a second part stationary relative to said first part; and means connected to said motor for moving said first part relative to said second part until said moving first part comes to a stop at said second part, thereby mechanically stalling said motor for said detection of said stalling from said comparison of said derived electric signal and said energization.

27. Apparatus as claimed in claim 26, wherein:
said moving means include means for mechanically tightening said first part with said motor onto said second part; and said operation effecting means include means for reenergizing said motor in a sense tending to move said first part away from said second part and for detaching said tightened first part by additionally energizing said motor in said sense.

28. In apparatus for controlling an electric motor including a motor winding, the improvement comprising in combination:
means for effecting operation of said motor by electric energization thereof;

means connected to said motor winding for deriving from said motor winding an electric signal indicative of motor speed;

means connected to said operation effecting means and electric signal deriving means for detecting stalling of said motor from a comparison of said derived electric signal and said electric energization;

means connected to said detecting means for effecting deenergization of said motor in response to said stalling detected from said comparison; and means connected to said operation effecting means for shorting said motor between periods of operation.

29. In apparatus for controlling an electric motor, including a motor winding, the improvement comprising in combination:
a pair of spaced mechanical stops defining respectively, a forward limit and a reverse limit;

means for effecting operation of said motor by electric energization thereof;

means connected to said motor for translating said motor operation into travel between said stops, and causing mechanical stalling of said motor at either of said stops;

means connected to said motor winding for deriving from said motor winding an electric signal indicative of motor speed;

means connected to said operation effecting means and electric signal producing means for detecting said stalling from a comparison of said derived electric signal and said energization;

means connected to said detecting means for effecting deenergization of said motor in reponse to said stalling detected from said comparison; and means connected to said detecting means for issuing a visual forward limit indication upon attainment of said forward limit and a visual reverse limit indication upon attainment of said reverse limit.

30. Apparatus as claimed in claim 29, wherein:
said electric signal deriving means include means for sensing a back electromotive force of said motor winding and means connected to said sensing means for deriving from said back electromotive force said electric signal indicative of motor speed.

31. In apparatus for controlling an electric motor, including a motor winding, the improvement comprising in combination:
a pair of spaced mechanical stops;

means for effecting operation of said motor by electric energization thereof;

means connected to said motor for translating said motor operation into travel between said stops, and causing mechanical stalling of said motor at either of said stops;

means connected to said motor winding for deriving from said motor winding an electric signal indicative of motor speed;

means connected to said operation effecting means and electric signal producing means for detecting said stalling from a comparison of said derived electric signal and said energization; and means connected to said detecting means for effecting deenergization of said motor in response to said stalling detected form said comparison;

said operation effecting means including means for reenergizing said motor for travel between said stops and for additionally energizing said motor during said reenergization for accelerating said travel away from either stop.

* * * * *